Jan. 23, 1951　　　　　D. C. BLACK　　　　2,538,754
SEED PLANTER WITH RADIALLY MOVABLE EJECTORS
Filed Oct. 26, 1944　　　　　　　　　　2 Sheets-Sheet 1

David C. Black
INVENTOR.

Jan. 23, 1951   D. C. BLACK   2,538,754
SEED PLANTER WITH RADIALLY MOVABLE EJECTORS
Filed Oct. 26, 1944   2 Sheets-Sheet 2

David C. Black
INVENTOR.

BY Clarence A. O'Brien
and Harvey B. Jackson
Attorneys

Patented Jan. 23, 1951

2,538,754

UNITED STATES PATENT OFFICE 2,538,754

SEED PLANTER WITH RADIALLY MOVABLE EJECTORS

David C. Black, Rushville, Mo.

Application October 26, 1944, Serial No. 560,453

1 Claim. (Cl. 222—218)

This invention relates to ways and means of more satisfactorily placing and uniformly planting seeds, such as for example corn, the structural means adapted for the purpose being of such design and form as to cast the seeds in row alignment and to intermittently accomplish this in a timely manner and at desirably spaced points.

Needless to say, I am sufficiently conversant with regularly used seed planters, as well as many patented types not in use, to realize that this field of invention is already fairly well developed and, to that extent, exemplary of many different styles and styles of distributors and planters. It is generally conceded by farmers and other users that proper devices for this purpose must be so designed as to space the seeds at the proper distances and to eject the seeds from the rotary wheel or other rotor-like device at the time interval necessary in respect to the speed of travel of the vehicle carrying the seed planter. Some tractor-drawn planters travel too fast and the seeds hang in the plates and are, therefore, not properly distributed. Many devices use complicated gears and these are continually wearing out and many other objections attend various known types. I believe, in carrying out the principles of this invention, that I have evolved and produced a structure which overcomes the many and main objections customarily met. Therefore, it is my aim to structurally and otherwise improve upon commonly known patented and marketed seed planters, this through the adoption of a wheel-like properly constructed device.

More specifically, the invention comprises a wheel-like device in the form of an annulus with radial spokes, said spokes being hollow and serving as cylinders, and said cylinders serving to house spring returned seed ejecting plungers, the plungers being actuated by cams and said cams being tripped by a trip roller fixedly stationed at a proper point.

Other features and advantages will become more readily apparent through the following description and the accompanying illustrative drawings.

In the drawings, wherein like numerals are employed to designate like parts throughout the same:

Figure 1:
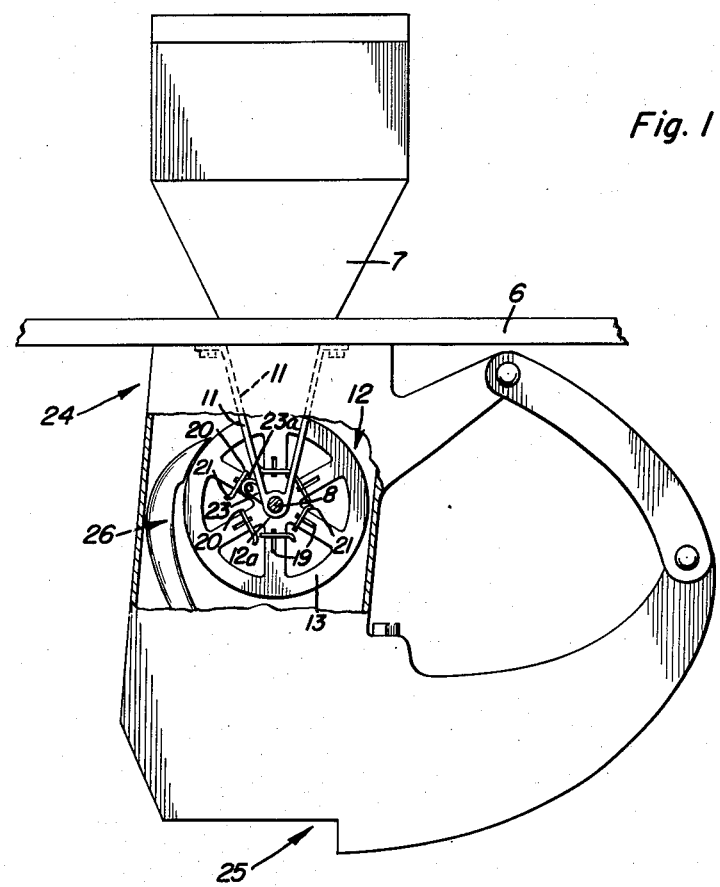
Figure 1 is an elevational view of a conventional-type seed planter embodying a seed planting wheel constructed in accordance with the structural and functional principles of the instant invention.
Figure 2:
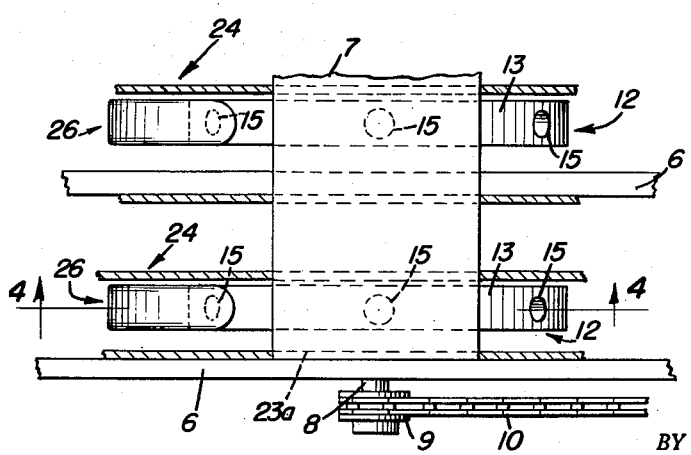
Figure 2 is a top plan view of the same with parts in section and other parts omitted for clearness of illustration.
Figure 3:
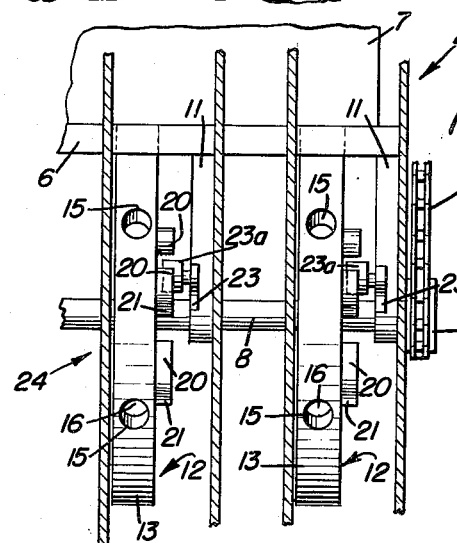
Figure 3 is a front end view observing the structure of Figure 2 in a direction from left to right.

It will be observed in the drawings that I have shown two seed planting wheels or devices. It is to be understood, however, that each is the same in construction and, for that reason, a description of one will suffice for both. Proceeding with this thought in mind and with reference to Figure 1, the numeral 6 designates, broadly, any suitable type of a frame which is drawn by a team of horses or tractor, or other powering means (not shown). Supported on this frame is an appropriate seed containing hopper 7. Beneath the frame is a horizontal axle 8 provided on its outer end with a sprocket 9 to accommodate sprocket chain 10. If desired, a pulley with a belt can be substituted for the sprocket and chain assembly. As a matter of fact, it is to be understood that I am not concerned with the construction of the frame, hopper, or propelling means for the axle. However, I have shown in Figure 1 a suitable hanger of inverted V-shaped form at 11 as a part of the assemblage, merely to bring out the structural organization and coaction of parts. What I am interested in is the rotary, vertical wheel-like seed receiving and distributing planter wheel or unit 12. This comprises an annulus 13 with radial spokes radiating from the hub 12a fixed to the axle 8, said spokes being hollow to define cylinders 14. As brought out in Figure 3, the outer ends of these cylinders constitute seed inlets or intakes 15 which register in circumferential order with the seed discharge opening in the hopper 7. These portions 15 may well be described as seed receiving and ejecting pockets. In each pocket the head 16 of an associated plunger is operable. The rod or stem of the plunger extends into the main body of the cylinder and is provided on its inner end with a head 17 which in turn is provided with an outstanding pin 18, said pin riding in a slot 19, and carrying a trigger foot 20 with a laterally deflected toe portion 21. The stem of the plunger is surrounded by a coiled plunger retracting and return spring 22. It will be noticed in Figure 3 that a suitable fixture or bracket 23 mounted on the V-hanger 11 is associated with the hub portion 12a of the structure and this bracket carries a free idling trip roller 23a which is located at the point indicated in Figure 1 so that as soon as the pocket has been charged with a single seed, on the next step around, the seed will be ejected.

Figure 4:
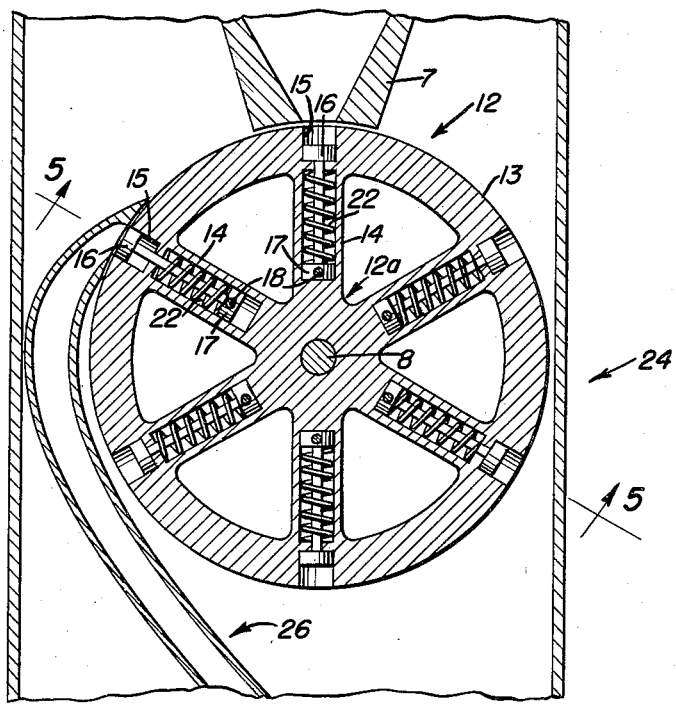
Figure 4 is an enlarged fragmentary sectional and elevational view on the plane of line 4—4 of Figure 2, looking in the direction of the arrows.
Figure 5:
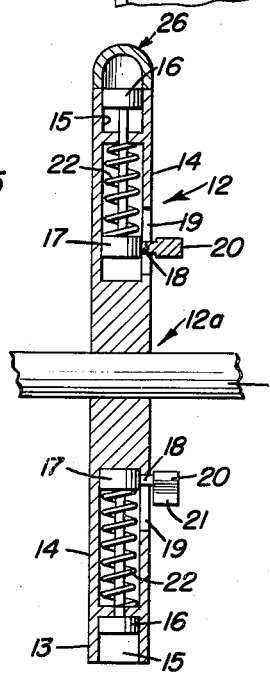
Figure 5 is a section which may be said to be on the plane of line 5—5 of Figure 4.

Explaining the operation, the seed is delivered into the pocket 15 as indicated in Figure 4 and this by way of the hopper discharge opening aligning with the pocket. Then as the wheel 12 continues to turn from right to left or counter-clockwise, the toe portion of 21 of the actuator foot 20 engages the trip roller 23a. The trip roller produces a cam action and presses the plunger out against the tension of the spring 22. This means, therefore, that the seed is properly ejected from the pocket into the row traversed by the planter wheel. The receiving pockets and plunger ejectors are located at circumferentially spaced equi-distant points to thus regulate the timing intervals for discharging of the seeds.

As before stated, the invention resides only in the especially constructed seed pick-up wheel, ejecting plungers and any suitable ways and means of delivering the seeds to the ground. However, in the drawings, I have shown any appropriate hopper means 7 supported in any suitable way on appropriate frame means. It is felt advisable to also bring out that the wheel is actually housed in a well known hollow shoe construction. The latter is characterized by a vertical tubular enclosure or casing 24 with a runner or shoe construction 25 and there is an appropriate channel or chute 26 in the casing and the channel is connected at its upper or intake end with the periphery of the wheel rim. That is to say, the mouth of the channel is located in a position so that it registers successively with the pockets 15. This is brought out in Figure 4 wherein the projected plunger is shown in a position ejecting a seed from the pocket into the chute 26.

In actual practice the sprocket chain is connected to another power driven sprocket (not shown) on the planter for driving the planter wheel 12.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

In a structure of the class described, in combination, a frame, a seed containing and feeding hopper mounted on said frame, a hanger bracket attached to and depending from said frame and including a bearing in its lower portion, a shaft mounted for rotation in said bearing, a wheel fixedly mounted for rotation on and with said shaft and embodying a hub portion, a rim with circumferentially spaced radially disposed seed receiving and discharging pockets and radial spokes between the hub and rim portions, each spoke being hollow in construction to function as a cylinder, the outer end of the cylinder being in communication with the coacting pocket, a seed-ejecting plunger member located and operable in the pocket and having a stem portion extending for reciprocation into the coacting cylinder, a coiled spring surrounding the stem portion and confined in said cylinder, said spring being of an expansion type and serving normally to retain the plunger in a receding position in the pocket, said stem having a lateral pin, said cylinder having a slot and said pin being slidable in said slot, said pin being further provided on its exposed outer end with a lateral foot forming a cam-type actuating trigger, a cam roller, and a bracket attaching said roller to said hanger, the cam roller being situated for successively contacting the respective triggers as the latter move in an orbital path around and in close proximity to the roller.

DAVID C. BLACK.

REFERENCES CITED

The following references are of record in the file of this patent:

FOREIGN PATENTS

| Number | Country | Date |
|---|---|---|
| 93,677 | Germany | Sept. 24, 1897 |
| 101,052 | Austria | Sept. 25, 1925 |